United States Patent
Kato et al.

(10) Patent No.: US 6,198,851 B1
(45) Date of Patent: Mar. 6, 2001

(54) APPARATUS AND METHOD FOR ENCODING/DECODING

(75) Inventors: Keisuke Kato; Takahiro Fukuhara, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/151,956

(22) Filed: Sep. 11, 1998

(30) Foreign Application Priority Data

Sep. 22, 1997 (JP) .................................................. 9-257218

(51) Int. Cl.$^7$ ................................ G06K 9/36; G06K 9/46
(52) U.S. Cl. ............................ 382/248; 382/249; 382/233
(58) Field of Search ..................................... 382/248, 249, 382/233, 236, 276

(56) References Cited

U.S. PATENT DOCUMENTS

| | | | |
|---|---|---|---|
| 4,941,193 | 7/1990 | Barnsley et al. | 382/56 |
| 5,065,447 | 11/1991 | Barnsley et al. | 382/56 |
| 5,347,600 | 9/1994 | Barnsley et al. | 382/56 |
| 5,867,221 | * 2/1999 | Pullen et al. | 348/417 |
| 5,867,603 | * 2/1999 | Barnsley et al. | 382/249 |

* cited by examiner

*Primary Examiner*—Phuoc Tran
(74) *Attorney, Agent, or Firm*—Frommer Lawrence & Haug, LLP.; William S. Frommer; Gordon Kessler

(57) ABSTRACT

A technique for encoding an interlaced picture comprises the steps of rearraying the interlaced picture on a scanning line basis, splitting the re-arrayed picture into a plurality of first block portions and splitting the re-arrayed picture into a plurality of second block portions. Each second block portion is transform processed to generate a plurality of transformed block portions, and it is determined which transformed block portion is most similar to a preselected first block portion. The second block portion corresponding to the determined transformed block portion is selected, and block position information indicating the position of the selected second block portion and a transformation parameter representing the transform processing of the selected second block portion are output. A technique for producing a decoded picture from the encoded interlaced picture comprises the steps of receiving a code including block position information indicating the position of a pre-transformed block and the aforementioned transformation parameter. Defined transformation processing is performed on a block identified by the block position information and is based on the transformation parameter. A decoded picture is constructed from the transformation processed blocks, and the decoded picture is re-arrayed on a scanning line basis and output.

37 Claims, 12 Drawing Sheets

APPARATUS AND METHOD FOR ENCODING/DECODING

FIELD OF THE INVENTION

This invention relates generally to an encoding method and apparatus, a decoding method and apparatus and recording medium, and more particularly to an encoding method and apparatus, a decoding method and apparatus and a recording medium usable in a system for high efficiency picture encoding or decoding for efficient picture transmission or storage.

BACKGROUND OF THE INVENTION

The International Organization for Standardization (ISO) has promulgated a standardized system for a conventional picture compression system called Joint Photographic Expert Group (JPEG). This system provides optimal encoding or decoding of pictures by applying a Discrete Cosine Transformation (DCT) to an image to transform that image into DCT coefficients. This system works most efficiently when a relatively large number of bits are to be employed to represent the encoded information. However, if the number of bits to be employed to represent the encoded information is less than a certain predetermined value, block distortion inherent in such a DCT transform becomes prevalent enough to deteriorate the quality of the picture which may be noticed by a viewer.

In response to these deficiencies of the JPEG and DCT procedure, a new Iterated Function System (IFS) picture compression technique has been proposed, and is beginning to gain favor. This IFS technique exploits self-similarity between portions of pictures and is based on fractal geometry. IFS works on the assumption that various portions of a particular picture are analogous, even though they may be of a different size, position, perspective, or orientation. IFS utilizes this redundancy in pictures to efficiently encode the picture without resulting block distortion, as may be generated in the JPEG system. Therefore, IFS is not nearly as dependent upon the number of bits to be used to represent the encoded information, and therefore the resolution during decoding does not suffer when a relatively smaller number of bits are to be used to represent the encoded information.

The basic structure of IFS is set forth in Arnaud E. Jaquin's thesis entitled "Image Coding Based on a Fractal Theory of Iterated Contractive Image Transformations", IEEE Transactions on Image Processing, Vol. 1, No. 1, pp. 18–30), and is further set forth in U.S. Pat. Nos. 5,347,600; 5,065,447 and 4,941,193, all issued to Barnsley et al. The encoding and decoding devices as generally set forth in these references will now be described with reference to prior art FIGS. 11 and 12.

Referring first to FIG. 11, the operation of an encoding device according to the prior art is shown. As is set forth in FIG. 11, an original picture 300 is entered to a block generating circuit 200 and is therein split into a plurality of blocks 301. All of blocks 301 together cover the entire original picture 300, but do not overlap with each other. Original picture 300 is also forwarded to reduced picture generating circuit 202. A picture 307 having a reduced size, such as by way of a reduction scheme as is known in the art which is obtained through the processing of reduced picture generating circuit 202 is forwarded and stored within reduced picture storage circuit 204.

Each of blocks 301 is forwarded to a proximate area search circuit 201 which searches reduced size picture 307 stored in reduced picture storage circuit 204 to determine whether any portions of the reduced size picture are analogous to the particular block 301 being searched. As noted above, this search includes searching for portions of reduced size picture 307 which are of different size, position, perspective, or orientation than the block 301 being searched. In accordance with the detected result indicating a successful search for a most similar portion, similar block position information 306, which specifies the position of the selected portion 305 within the reduced size picture 307 that is to be extracted, is transmitted to reduced picture storage circuit 204. Thus, in accordance with these instructions, selected portion 305 of the reduced size picture 307 stored within reduced picture storage circuit 204 is extracted, and is transmitted to a rotation/inversion/level value conversion circuit 203.

Within rotation/inversion/level value conversion circuit 203, portion 305 of reduced size picture 307 is processed by a rotation/inversion/level value transformation in accordance with transformation parameters 304 which are supplied from proximate area search circuit 201. These transformation parameters 304 are indicative of the transformation which must be performed in order to transform portion 305 of reduced size picture 307 into block 301. These parameters are determined when a particular portion 305 of reduced size picture 307 is found to most closely correspond to block 301 being searched. Upon transformation at rotation/inversion/level value conversion circuit 203, a transform reduced-size picture 303 is forwarded to proximate area search circuit 201. There as a result, transformation parameters 304 and similar block position information 306 are output as ISF codes 302. Thus, a first picture is input to the system, and the output includes at least transformation parameters, for transforming a first block into a second similar block, and position information, for determining the position of the second block within the encoded picture.

Referring next to FIG. 12, a decoding apparatus is provided in which the IFS codes, including transformation parameters and similar block position information 302 which are output by the encoding device of FIG. 11, are entered into and stored in an IFS code storage circuit 205. IFS codes 302 are then sequentially read out from IFS code storage circuit 205 for each block, and are forwarded to an IFS code read out circuit 206. IFS code read out circuit 206 divides the codes into similar block position information 306 and transformation parameters 304 as provided by the encoder. Similar block position information 306 is then forwarded to reduced picture storage circuit 204 in order to reproduce the area of the reduced-size picture specified by similar block position information 306. The portion 305 of the reduced size picture stored in reduced picture storage circuit 204 corresponding to the specified area is then transmitted to a rotation/inversion/level value conversion circuit 203, and is transformed in accordance with transformation parameters 304 which are supplied from IFS code read out circuit 206. The resulting transformed picture 303 forwarded from rotation/inversion/level conversion circuit 203 is stored within decoded picture storage circuit 208. This procedure is performed for each block in the picture for which IFS codes are provided.

After all of the IFS codes for all of the blocks have been read out, IFS read out circuit 206 sends a READ OUT END notification signal 310 to duplication control circuit 207. Duplication control circuit 207 counts the number of recursive decoding/duplicating operations that have been executed, and if this count has not reached a predetermined value, duplication control circuit 207 sends a reprocessing command signal 309 to IFS code read out circuit 206 in order to continue execution of decoding processing for all of the blocks in the picture according to a recursive decoding procedure. Simultaneously, the reprocessing command information is sent via control signal 311 to a switch 209 in order to send partially decoded picture 313 to reduced picture generating circuit 202 via information path 314. Reduced picture generating circuit 202 then generates a partially decoded reduced size picture 315 of decoded picture 313 in a manner similar to that as in the encoding device in order to re-write the contents of the picture stored in contracted picture storage circuit 204 and to enable a next recursive decoding step to start with partially decoded reduced picture 315. If the proper number of recursive decoding operations have taken place, and thus the duplicating operation has been carried out the predetermined number of times, reprocessing command information is sent by a decoded picture output control signal 311 to a switch 209. Switch 209 is controlled in order to couple a decoded picture 313 output from decoded picture storage circuit 208 to a picture output port 316. Decoded picture 313 comprises a conglomeration picture of all of the decoded blocks noted above after being recursively decoded for a predetermined number of iterations and is read out from decoded picture storage circuit 208 in accordance with control signal 312.

While this information encoding and decoding technique has been somewhat satisfactory, it has suffered from at least one major drawback. This drawback includes the encoding and decoding of an interlaced picture. An interlaced picture comprises a first field and a second field, which when combined in an alternating line-by-line basis generate a complete frame. This format is customary in television picture transmission. However, because of this interlaced scanning technique, it is very difficult to find similarity between various blocks of a frame, formed of portions from one field and portions from the other field, when objects within a series of interlaced pictures undergoes movement. That is, there is movement of a portion of one field relative to a portion from the other field. Thus, the picture quality is deteriorated and the encoding scheme performs less than optimal encoding.

Therefore, it would be beneficial to provide an improved encoding apparatus and method which overcomes the drawbacks of the prior art.

OBJECTS OF THE INVENTION

Accordingly, it is an object of the invention to provide an improved encoding and decoding method and apparatus.

Another object of the invention is to provide an improved encoding and decoding apparatus and method which allows for an interlaced picture to be efficiently encoded.

A still further object of the invention is to provide an improved encoding and decoding apparatus and method in which an IFS encoding scheme may be efficiently applied to an interlaced picture.

Yet another object of the invention is to provide a recording medium including all information for implementing an improved encoding and decoding method which allows for an interlaced picture to be efficiently encoded by an IFS encoding scheme.

Still other objects and advantages of the invention will in part be obvious and will in part be apparent from the specification and drawings.

SUMMARY OF THE INVENTION

Generally speaking, in accordance with the invention, an improved IFS encoding apparatus and method are provided.

The encoding apparatus includes picture transformation means for re-arraying an input picture from an alternating scanning line basis, thus grouping all the scanning lines from a first field together and grouping all the scanning lines from a second field together and forming a frame picture combining the scanning lines from the first field and the scanning lines from the second field. The apparatus further includes first and second block splitters for splitting a picture received from the picture transformation means into at least first and second block pictures. A picture memory for holding a full picture of the second block picture provided from the second block splitter is also provided. A picture transformation/generator for processing the second block picture from the second block generating unit with a defined transformation, and a similar block search means for searching all of the transformed block pictures provided from the picture transformation/generator, wherein a block picture most similar to the first block picture from the first block generator is determined, are provided. An encoder/multiplexor for encoding and multiplexing the block numbers from the similar block searcher and the transformation parameters from the picture transformation generator is also provided.

The picture transformer generates and outputs a picture obtained by rearraying an input picture from an alternating scanning line basis. The first block generating means splits the output picture into a plurality of blocks of a specified size which are then outputted sequentially. At the same time, a reduced-size block picture is generated by second block generating unit. A transformation process is applied by the picture transformation/generator to various portions of the reduced-size picture output from the second block generating unit, and a plurality of transform block pictures are output to the similar block search means. Similar block search means determines a best match between the first picture block and one of the plurality of transformed block pictures by determining the minimum error therebetween. The encoder/multiplexor then encodes the portion of the reduced-size picture corresponding to the transform block picture providing the best match and any transformation parameters, such as by Huffman encoding. This procedure is performed for each block generated by first block generating means. The encoded data corresponding to the plurality of first blocks is combined via a multiplexor and output from the encoding apparatus as a data stream.

The decoding apparatus constructed in accordance with the invention is adapted to decode the encoded information. The decoding apparatus separates the multiplexed code words for each block and separates out the block transformation and block position parameters. Through the use of these parameters, an original block based on the block number, block position and transformation parameters is generated. Each of these reproduced block pictures is stored in a picture memory means, which reconstructs the full picture through a recursive decoding operation. After the full picture has been generated, the picture is fed once again to a picture restoration circuit where it is rearrayed in an alternating scanning line basis (a procedure opposite to that performed during encoding) to restore the original picture.

The several steps and the relation of one or more of steps with respect to each of the others and the apparatus embodying features of construction, combinations of elements and arrangement of parts which are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
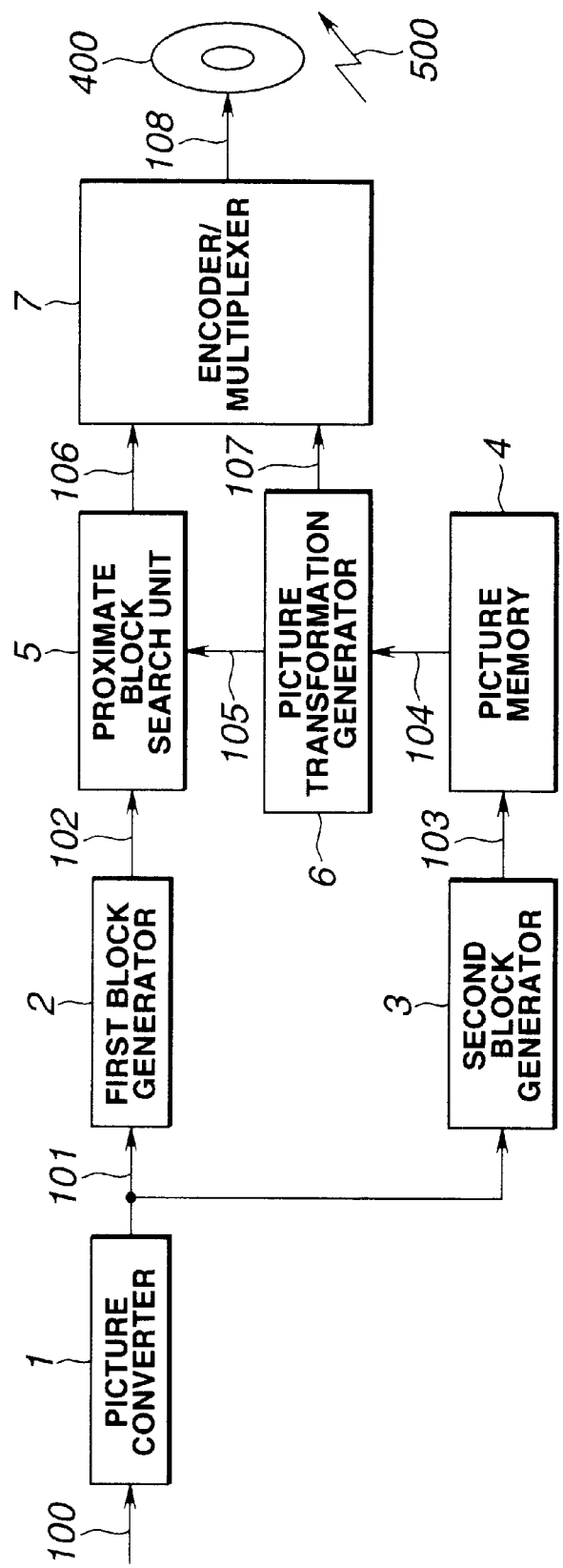
FIG. 1 is a block diagram depicting an exemplary structure of an encoding device constructed in accordance with the invention.

Referring first to FIG. 1, an encoding device constructed in accordance with the invention includes a picture converter 1 for rearraying a picture on a scanning line basis, a first block generator 2 for generating a first block picture and a second block generator 3 for generating a second block picture, each of which receives a re-arrayed converted picture 101 from picture converter 1. The encoding device further includes a picture memory 4 for storing a frame of a second block picture 103 received from second block generator 3. A proximate block search unit 5 is provided for searching for a second block portion 104 of the picture stored in picture memory 4 most similar to a first block portion 102 received from first block generator 2. A picture transformation generator 6 for transforming a plurality of second block portions 104 read out from picture memory 4 in accordance with a defined transformation process is also provided. These transformed portions 105 are forwarded to proximate block search unit 5. Transformation parameters 107 and block position parameters 106 for a selected block are forwarded to encoder/multiplexer 7. Encoder/multiplexer 7 provides a final encoded output 108 to be recorded on a recording medium 400 or to be transmitted over a communication network 500.

During operation an original interlaced picture 100 is forwarded to picture converter 1. Picture converter 1 rearrays the scanning lines of interlaced picture 100 to form a re-arrayed converted picture 101 comprised of sequential scan lines, which is output from picture converter 1 to first block generator 2 and second block generator 3. Converted picture 101 forwarded to first block generator 2 is divided into a plurality of first block portions 102. The combination of all of these block portions together equals one full picture, referred to as the first block picture, and the blocks are preferably chosen so that they do not overlap one another.

Converted picture 101 forwarded to second block generator 3 is split into a plurality of second block portions 104 constituting one full picture referred to as the second block picture 103. This generated second block picture 103, which is stored in picture memory unit 4, includes block position information in addition to pixel information for each second block portion 104 making up second block picture 103. Thus, through the above-described series of operations, a complete first block picture is split into first block portions 102 and second block picture 103 is split into appropriate second block portions 104 and properly stored.

After the operation of first block generator 2 and second block generator 3 on converted picture 101, one first block portion 102 is supplied to proximate block search unit 5 from first block generator 2. Each second block portion 104 making up second block picture 103 is output sequentially by picture memory 4 to picture transformation generator 6 which performs a defined transformation processing such as rotation, lateral or vertical movement, enlargement or contraction, or change of perspective or orientation on each second block portion 104, to generate a plurality of transformed block portions 105. These transformed block portions 105 are sequentially output to proximate block search unit 5 which performs a comparison between the one first block portion 102 and each transformed block portion 105 in order to search for the transformed block portion 105 that is the closest match to, i.e., that minimizes a difference error when compared with, the one first block picture 102. Transformed block portion 105 found to produce a minimum error is selected to encode the one first block 102. Thus, block position parameters, or block number 106 of the one first block portion 102 and transformation parameters 107 are produced as representing the positioning movement and transformation which must be performed on selected transformed block portion 105 to result in the one first block portion 102 and are thereafter encoded such as by Huffman coding within encoder/multiplexer 7 to encode first block portion 102. Code words are generated which are multiplexed and output as a data output 108 of the encoding device. Output 108 of the encoding device may be stored on a recording medium 400 such as an optical disk, transmitted over a communications network 500, or stored in various other media. The foregoing procedure is repeated for each block portion 102 generated by first block generating unit 2.

Figure 2:
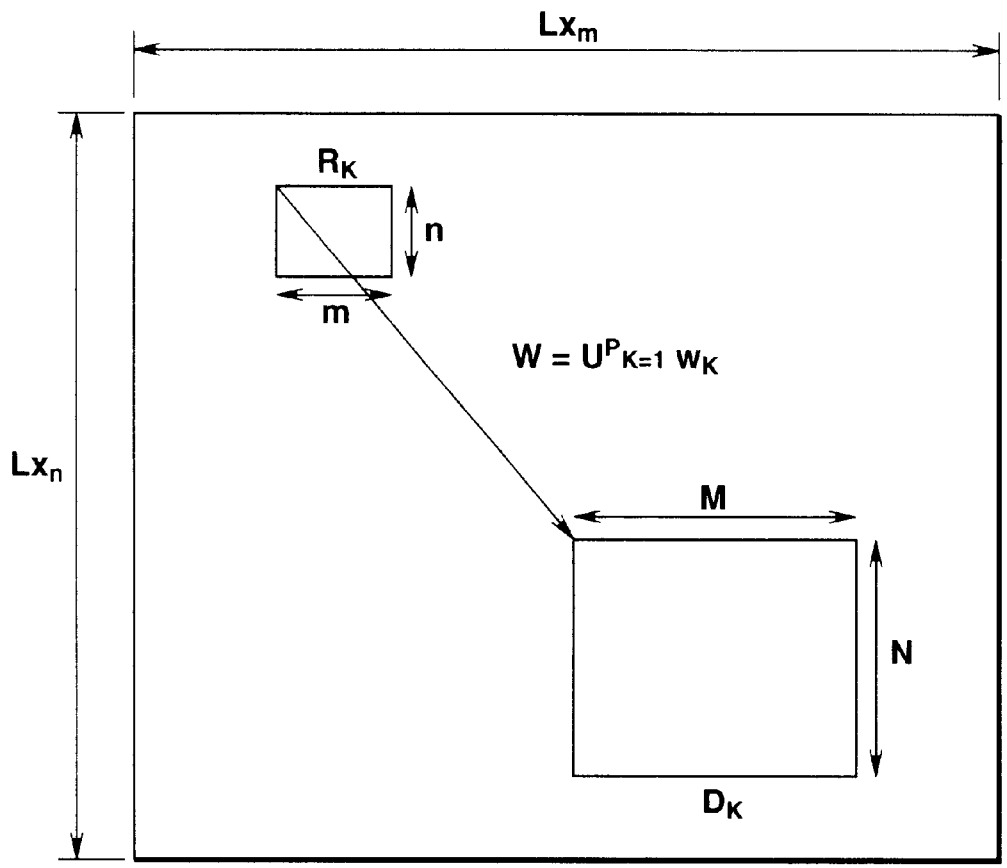
FIG. 2 depicts a mapping process between picture blocks in accordance with the invention.

Referring next to FIG. 2, the basic theory of the iterative transforming coding characteristic of the present invention will be explained. Iterative transform encoding is a technique which is performed by repeatedly executing contractive mapping from a domain block to a range block for all range blocks making up a full picture. This mapping may include transforming the domain block in any number of ways including rotation, lateral or vertical movement, enlargement or contraction, or change of perspective or orientation. Once a domain block closest to the range block is found (i.e., generates the least difference data), the range block is encoded by IFS coding according to the following procedure. The encoding scheme allows for encoding of only the transition parameters and position information of the domain blocks which are most similar to the corresponding range blocks. As is shown in FIG. 2, a range block $R_k$ corresponds to a first block portion 102 while the domain block $D_k$ corresponds to a second block portion 104. The block size of $R_k$ is m×n, while that of $D_k$ is M×N. As is also shown in FIG. 2, there are L×L first range blocks. The setting of the size of the range block and the domain block is crucial since these block sizes influence the encoding efficiency significantly.

The block picture transformation sequence that takes place within picture transformation generator 6 is the transform from block $D_k$ to block $R_k$. Therefore, if the mapping function to the block k is $W_k$, and the number of blocks of the second block picture required in mapping the entire full picture is P, the picture $f$ is mapped to $$W(f) = w_1(f) \cup w_2(f) \cup \ldots \cup E w_p(f) \quad (1)$$

by the mapping function w of the entire picture. Therefore, W is represented by the following equation (2):

$$W = \bigcup_{k=1}^{P} w_k \quad (2)$$

It does not matter which type of the mapping function W is used, as long as the function is a converging function. In general, contractive mapping is used for assuring the convergence.

In addition, affine transformation is used in view of its simplicity in processing. The case of mapping block $D_k$ to block $R_k$ by affine transformation can be expressed by the following equation (3)

$$v_i(x, y) = \begin{bmatrix} a_i & b_i \\ c_i & d_i \end{bmatrix} \begin{bmatrix} x \\ y \end{bmatrix} + \begin{bmatrix} e_i \\ f_i \end{bmatrix} \quad (3)$$

The transformation between two blocks, such as transformation including rotation, lateral or vertical movement, contraction or enlargement, can be represented fully by this equation (3), each of the parameters indicating various transformations, as is well known in the art. Thus, (x,y) represents the coordinates of a point before affine transformation while ($a_i x + b_i y + e_i$, $c_i x + d_i y + f_i$) represent the coordinates of a point after transformation denoted as $v_i(x,y)$.

Picture transformation generator 6 (FIG. 1) includes circuits or processing modules for transformation, such as rotation, lateral or vertical movement, contraction or enlargement, and can therefore perform all of the functions that are represented in equation (3). By way of example, as is shown in FIG. 2, the upper left corner of the domain block $D_k$ is mapped to the upper left corner of range block $R_k$. The transformation of the gray tone values of pixels in a block picture can similarly be realized by an affine transformation as noted above.

For each second block portion 104 being read out from picture memory 4, one or more of a plurality of transformation coefficients ($a_i$, $b_i$, $c_i$, $d_i$, $e_i$, $f_i$) of equation (3) can be changed in a plurality of ways to alter the transform applied to the second block portion 104 by picture transformation generator 6. The plurality of second block portions 104 generated from second block generator 3 are transformed in various ways to obtain a plurality of transformed block portions 105. Of these plural transformed block portions 105, the transformed block portion closest to the one first block picture 102 is detected by proximate block search unit 5. However, if the input picture to the encoding device is an interlaced picture, moving picture portions in a full picture are shifted from line to line, and render it difficult to detect the most similar block picture or to reproduce the original picture during a later decoding procedure.

The picture transformation procedure which takes place in picture converter 1 in accordance with the invention in order to overcome this difficulty will now be explained with reference to FIG. 3. An interlaced input picture 100 comprises X pixels in the vertical direction and Y pixels in the horizontal direction as shown on the left side of FIG. 3. In accordance with a standard interlaced picture, alternate lines of two field pictures are combined to form the complete interlaced full frame picture. Since the field containing the even lines and the field containing the odd lines are offset from each other in time, and thus position, as is shown on the left side in FIG. 3, the resulting picture may be blurred if the object depicted within picture 100 is a moving object, and may be seen as object 61.

Figure 3:
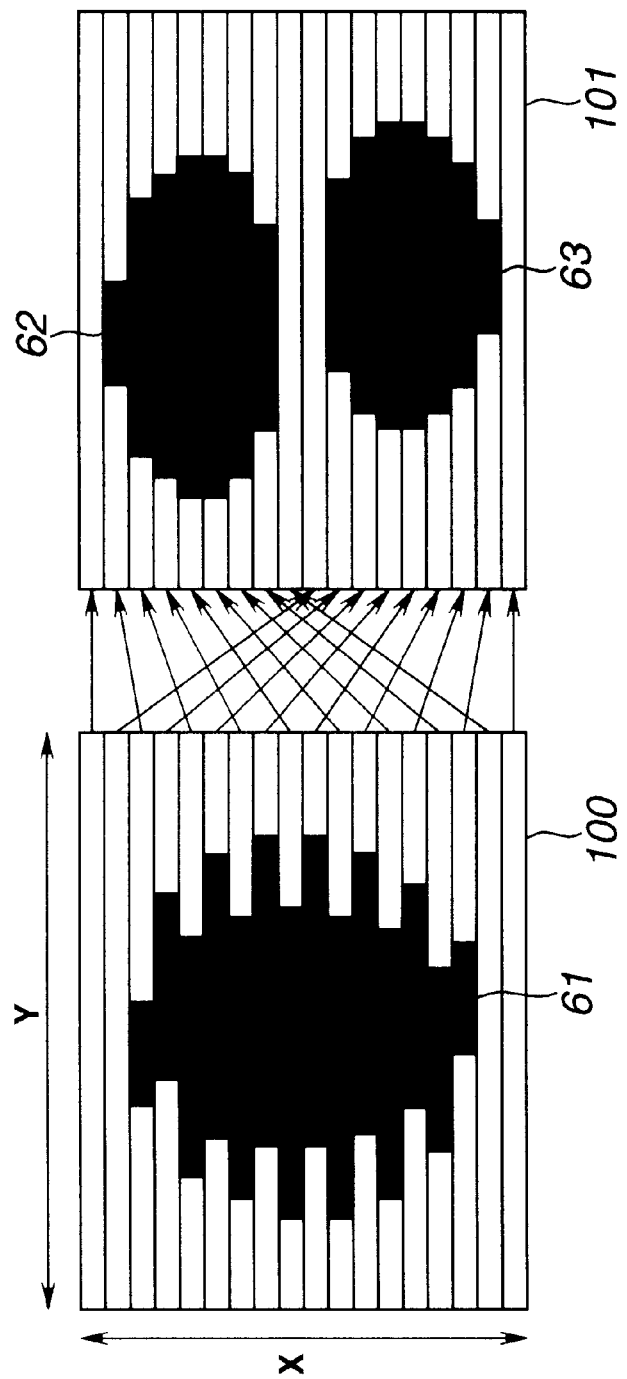
FIG. 3 depicts the operation of re-arraying scanning lines of a picture from an alternating scanning line basis in accordance with the invention.

However, in order to remedy this situation, in accordance with this invention, this picture is re-arrayed on a sequential scanning line basis from an alternating scanning line picture so as to be converted to a single picture 101 composed of two field pictures, at an upper portion and a lower portion respectively, of the full-frame picture as shown on the right side in FIG. 3. Rather than interlacing, the even lines from the first (even) field and odd lines from the second (odd) field, all of the lines from the first (even) field are grouped and depicted together, and all of the lines from the second (odd) field are grouped and depicted together. Thus, an object 62, which comprises only lines of the first field is not blurred, an object 63 which comprises only lines of the second field is also not blurred, and both are included within a single picture frame. The range block can be defined from the portion of the picture including the first field and the second field, and the domain block can be searched from the complete picture including data of the first field and data of the second field, thus improving the encoding efficiency.

Figure 4:
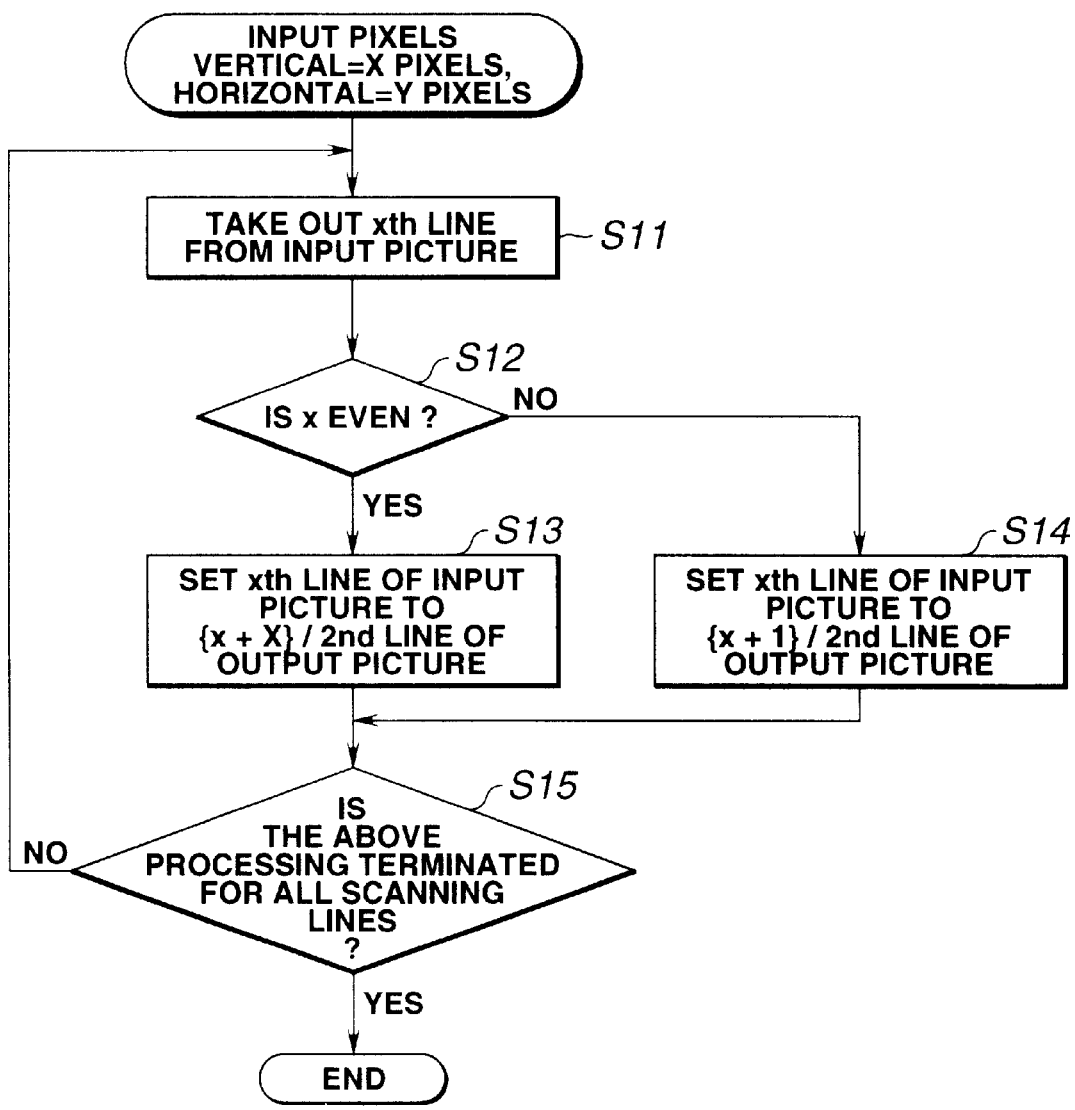
FIG. 4 is flowchart showing the operation of a picture transformation unit of the encoding device constructed in accordance with the invention.

The procedure taking place within picture converter 1 of FIG. 1 will now be explained with reference to the flowchart of FIG. 4.

The input interlaced picture comprises X vertical pixels and Y horizontal pixels. Therefore, the number of scanning lines is X since the scan takes place in the horizontal direction. While X is set to an even number in FIG. 4, in an alternative embodiment X may be an odd number as well.

At step S11, an xth scanning line, where $1 \leq x \leq X$, of the input picture 100, is taken out. At the next step S12, branching occurs depending on whether x is even or odd. If x is even (the inquiry is answered in the affirmative), processing transfers to step S13 to output the scanning line as the (x+X)/2nd scanning line. If x is odd (the inquiry is answered in the negative), processing transfers to step S14 to output this scanning line as the (x+1)/2nd scanning line of the output picture 101. Then, processing transfers to step S15.

At step S15, branching occurs depending on whether or not the above processing has come to a close for all scanning lines. That is, if the above processing has come to a close for all scanning lines (the inquiry is answered in the affirmative), the sequence of steps is terminated. If otherwise (the inquiry is answered in the negative), processing reverts to step S11. In this manner, the above processing is executed for all scanning lines.

The above processing results in two similar field pictures arrayed in the up-and-down direction (right side in FIG. 3). If iterative transform encoding is applied to this picture, similar blocks can be found more easily than if the interlaced input picture 100 is encoded directly. Moreover, the encoding efficiency can be improved since similar blocks can be searched from two field pictures in one frame picture.

The above-described conversion technique can be specifically limited to affine transformation. Although the scanning lines are re-arrayed in the above-described embodiment in the up-and-down direction, these may be arrayed in the left-and-right direction to constitute a full picture.

Figure 5:
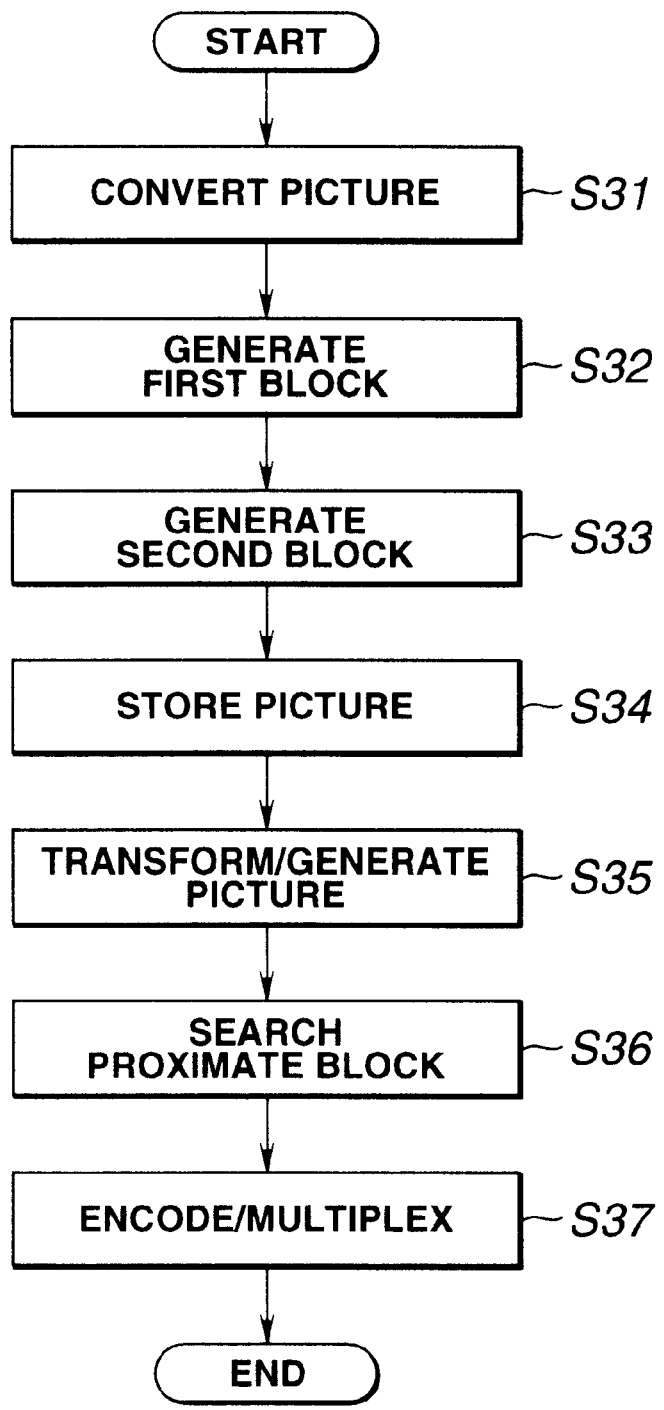
FIG. 5 is a flowchart showing a series of steps of the encoding method in accordance with the invention.

Referring next to the flowchart shown in FIG. 5, a series of operations for performing the encoding method is explained.

At the first step S31, the input picture is re-arrayed on a scanning line basis by way of picture conversion using the procedure noted above. Then, processing transfers to step S32. At this step S32, the first block picture is split (generated) from the picture converted at step S31 producing a plurality of first block portions 102. At the next step S33, the second block picture is split (generated) from the picture 103 converted at step S31 into various second block portions 104. Then, processing transfers to step S34.

At this step S34, a full picture including all of the second block portions generated at the step S33 is stored in memory 4. At the next step S35, individual second block portions 104 of the second block picture 103 stored at the step S34 are read out sequentially and transformed in a defined manner by picture transformation generator 6. Then, processing transfers to step S36.

At this step S36, a search is performed by proximate block search unit 5 for the one of the second block portions 104 most similar to a selected one of the plurality of first block pictures 102 generated at step S32. At the next step S37, the block number indicating the one second block portion 104 (domain block) most similar to the selected first block picture 102 (range block) being tested and the transformation parameters used for the picture transformation and generation from the selected second block portion 104 to the selected first block portion 102 being tested are encoded and multiplexed before terminating the series of steps of the encoding method.

Figure 6:
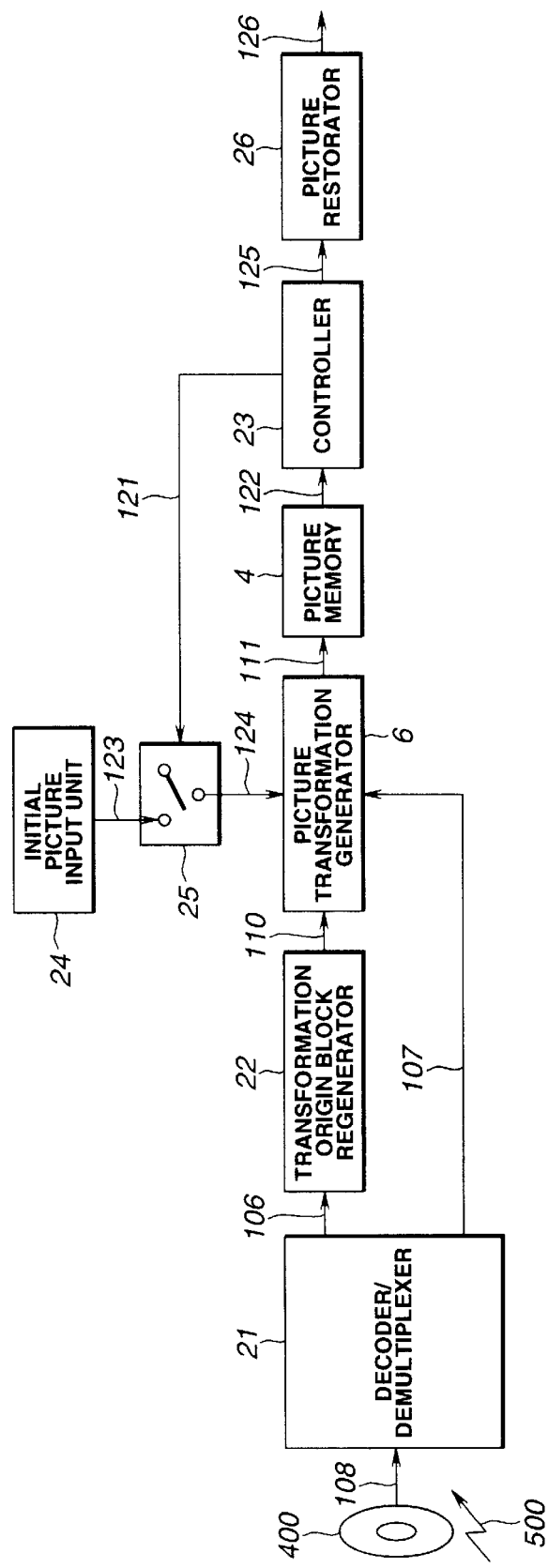
FIG. 6 is a block diagram depicting an exemplary structure of a decoding device constructed in accordance with the invention.

Referring next to FIG. 6, a decoding apparatus constructed in accordance with the invention will now be described. This decoding apparatus is a counterpart to the iterative picture transformation encoding device explained above with respect to FIGS. 1–5 and is useful for decoding data encoded thereby. Referring to FIG. 6, a storage medium 400, a communication network 500, or other data input device provides encoded information to a decoder/demultiplexer 21. Decoder/demultiplexer 21 forwards block number information 106 to transformation origin block regenerator 22, and provides transformation parameters 107 to a picture transformation generator 6, which is the same as the picture transformation generator shown in FIG. 1. Transformation origin block regenerator 22 forwards block position information 110 representing a block transformation origin position (position of the domain block) to the picture transformation generator 6. A switch 25 provides an input picture 124 to picture transformation generator 6, selecting between a partially decoded picture recursively supplied from a controller 23 and an initial picture from initial picture unit 24 from which decoding begins. Picture transformation generator 6 forwards transformed picture information to picture memory 4 (which is the same as memory 4 shown in FIG. 1) which is then forwarded to controller 23. Controller 23 counts the number of times the recursive decoding process has taken place, so that the process may be concluded when a predetermined number of recursions have occurred, and therefore the entire desired image has been decoded. Further, the decoding device includes a picture restorer 26 for re-arraying the finally decoded picture on a line-by-line basis from the sequential line format of the invention as shown on the right side of FIG. 3 to a standard interlaced picture as shown on the left side of FIG. 3.

The operation of the decoding device depicted in FIG. 6 and constructed in accordance with the invention will now be explained.

The decoding device of the invention first receives multiplexed encoded data 108 from a recording medium 400, such as an optical storage medium, or via a transmission network or channel 500, such as a communications network. Decoder/demultiplexer 21 demultiplexes the multiplexed encoded data to generate block number data 106 and transformation parameters 107 associated therewith. Block number data 106 is forwarded to transformation origin block regenerator 22, while transformation parameters 107 are forwarded to picture transformation generator 6. Transformation origin block regenerator 22 outputs block position information 110 representing a block transformation origin position based on block number data 106 received from decoder/demultiplexer 21. In addition to receiving transformation parameters 107 and block position information 110, picture transformation generator 6 receives an input picture 124, which comprises either an initial picture 123 from initial picture unit 24 or a partially decoded picture 121 from controller 23, the latter being generated by recursive decoding in a decoding loop. Picture transformation generator 6 operates to output a transformed decoded or partially decoded block picture 111 to picture memory 4. The picture transformation generator 6 performs a defined transformation processing in accordance with the received block information on input picture 124 by using transformation parameters 107 and block position information 110 representing block transformation origin position. This transformation may include rotation, lateral or vertical movement, enlargement or contraction, or change in perspective or orientation.

When the recursive decoding procedure is started, initial picture 123 is provided from initial picture unit 24 and is supplied to picture transformation generator 6 by switch 25 as input picture 124. On subsequent iterations, a partially decoded picture 121 is fed back from controller 23 through switch 25 and becomes input picture 124 fed to picture transformation generator 6. Thus, a partially or fully decoded picture 111 is forwarded from the picture transformation generator and is stored in picture memory 4. The picture memory includes the entire picture, which is decoded to some varying degree, the quality of the output picture improving with each iteration. At each recursion, an entire picture 122 is output from picture memory 4 and forwarded to controller 23 to be fed back for further decoding. Controller 23 counts the number of iterations in the decoding loop; and if the predetermined number of decoding iterations has not been reached, the partially decoded picture 121 is fed back from controller 23 via switch 25 to picture transformation generator 6 as input picture 124. When controller 23 determines that the predetermined number of decoding iterative loops has been performed, the loop is concluded, and a final picture 125 is provided from the controller 23 to picture restorer 26. Through recursive decoding, the picture is fully decoded. The transformation technique employed may be limited to affine transformation, or may include other transformations as well.

In an initial state during a first iteration of the decoding loop, an initial picture 123 stored in initial picture input unit 24 is fed via switch 25 as input picture 124 to picture transformation generator 6. This initial picture 123 stored within initial picture input unit 24 may be any picture. While a picture similar to that which is to be decoded improves decoding efficiency, an iterative transformed coding and decoding scheme (IFS) is of the nature that regardless of the starting picture, a transformation will converge to the intended decoded picture after a certain predetermined number of iterations. Thus, an initial picture 123 may comprise a single gray tone picture, such as an all white picture, or may alternatively comprise a reduced picture image transmitted along with the data from the encoder, or any other picture. However, the closer the initial picture is to the desired decoded picture, the more quickly the encoded information will be decoded.

By the decoding sequence noted above, controller 23 outputs a decoded picture which comprises two field pictures arrayed one on top of the other as shown on the right side of FIG. 3.

Thereafter, picture restorer 26 acts upon the decoded picture to re-array the picture on a line-by-line basis to reconstitute the original interlaced picture. Thus, picture restorer 26 acts in a manner opposite to that of picture converter 1. The operation of picture restorer 26 will now be described, making reference to the flow chart of FIG. 7.

A decoded picture is provided to picture restorer 26 comprising X vertical pixels and Y horizontal pixels as in the originally encoded picture. As with the originally encoded picture, the number of scanning lines is X. Additionally, as noted above with respect to encoding, this picture restoration procedure may be performed whether the number of scanning lines is an even number or an odd number, while in this example, the number of scanning lines X is an even number.

In step S21, the xth scanning line ($1 \geq x \geq X$) is removed from the decoded picture. Thereafter, inquiry S22 determines whether or not x is $\leq X/2$ for this particular scanning line. That is, if x is $\leq X/2$ is met (the inquiry is answered in the affirmative), processing transfers to step 23 and if otherwise (the inquiry is answered in the negative), processing transfers to step S24. At step S23, the scanning line is output as the x×2-1th scanning line, whereas, at step S24, this scanning line would be output as the x×2-Xth scanning line.

Thereafter, processing transfers to inquiry S25 which determines whether or not the above processing has been completed for each of the total number of scanning lines. If the above processing has been completed for each of the scanning lines (the inquiry is answered in the affirmative), the series of steps is terminated, whereas, if otherwise (the inquiry is answered in the negative), processing reverts back to step S21. Thus, in this manner, it is insured that processing is executed for each of the scanning lines.

Figure 7:
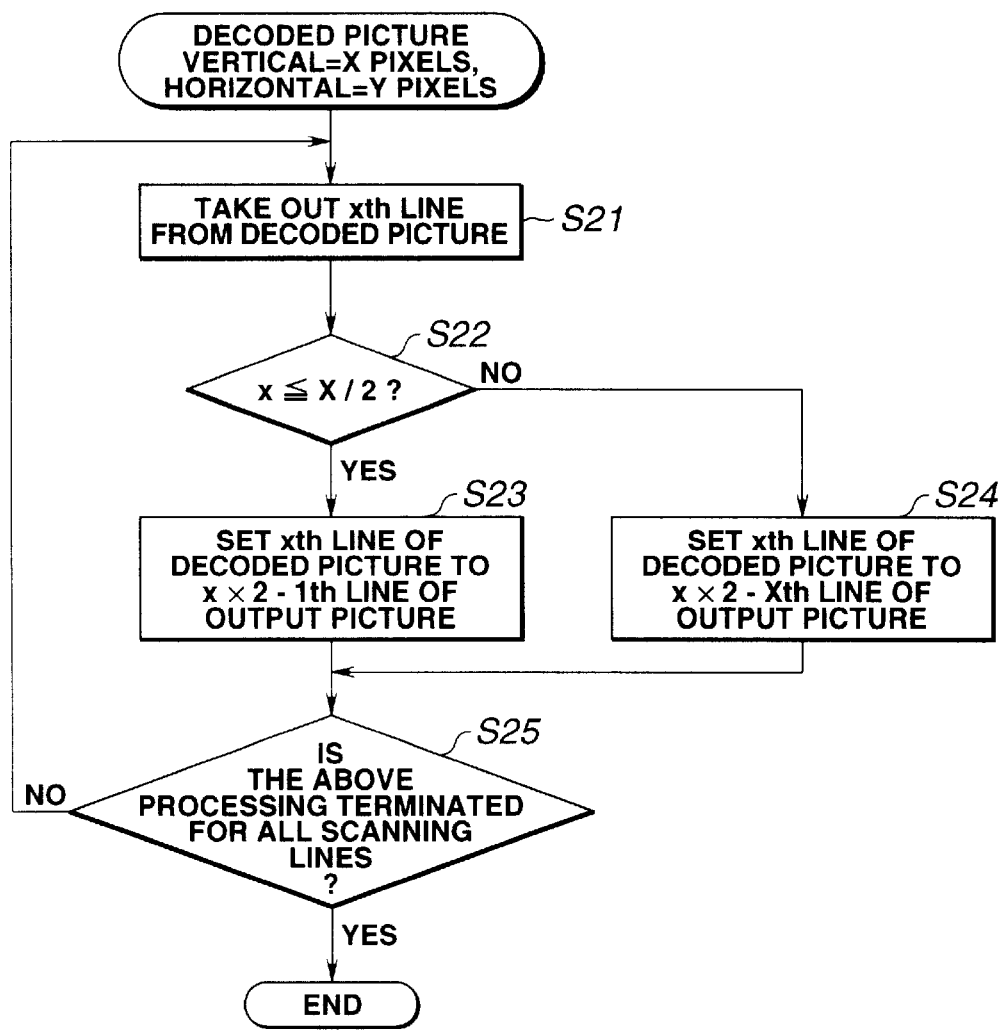
FIG. 7 is a flowchart showing the operation of a picture restoration unit of the decoding device constructed in accordance with the invention.

The processing shown in FIG. 7 produces an output picture 126 which is an interlaced picture, and this output picture 126 is output from the decoder as an interlaced, decoded picture. In an alternative format for picture restorer 26, the picture is output as a noninterlaced picture. Still other formats may be used, depending on the particular display device to be used.

Figure 8:
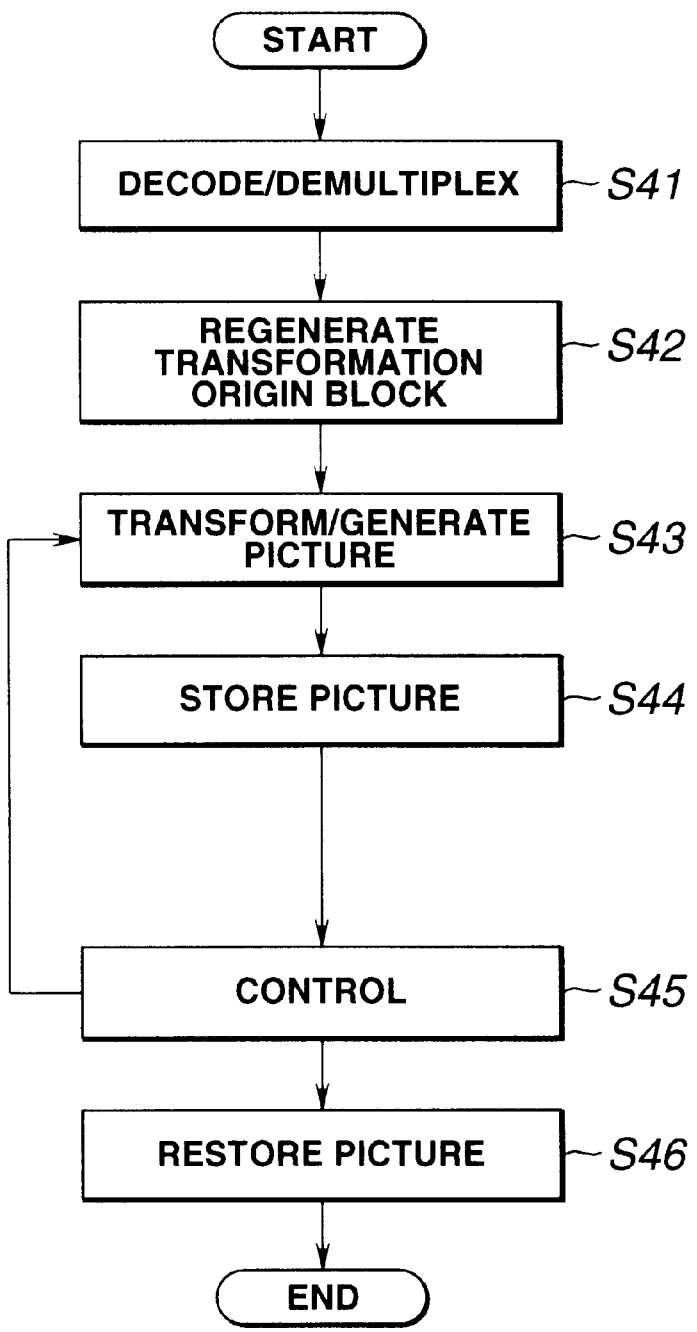
FIG. 8 is a flowchart showing a decoding method in accordance with the invention.

The steps implemented by the decoding method for decoding the encoded image will now be described with reference to FIG. 8. At step S41, a multiplexed encoded data is demultiplexed by decoder/demultiplexer 21 into respective code words which include the block position information representing block transformation origin position and the transformation parameters. The next step S42, the block position information of the transformation origin is output by original block regenerator 22 based on the block number separated in step S41 by decoder/demultiplexer 21. Processing then advances to step S43 where the block picture indicated by the block position information of the transformation origin block is transformed by picture transformation generator 6 in a manner defined by the transformation parameters. This transformation is based upon an initial picture during a first iteration, which may be any picture at all, a picture close to the picture to be coded, or even a blank picture. Thereafter, for further recursive loops, a partially decoded block picture is fed back to picture transformation generator 6. At step S44, a full picture as partially or fully decoded in step S43 by picture transformation generator 6 is stored in picture memory 4. At the next step, S45, controller 23 counts the number of times the recursive loop has taken place; and if the controller determines that a predetermined number of recursive loops has been reached, it is assumed that the picture is completely decoded, and the decoding process advances to step S46 which outputs a decoded block picture from controller 23 to picture restorer 26 to restore the picture using the procedure outlined with reference to FIG. 7.

However, if the predetermined number of recursive loops has not been reached, step S45 determines that the encoded picture has not been fully decoded and so processing reverts to step S43, and the previously partially decoded picture is fed back to picture transformation generator 6 via switch 25, and decoding continues. Therefore, in this manner, through the selection of the number of recursive loops to be performed, a desired picture quality can be chosen, and then the picture, having reached that particular quality, can be output.

Figure 9:
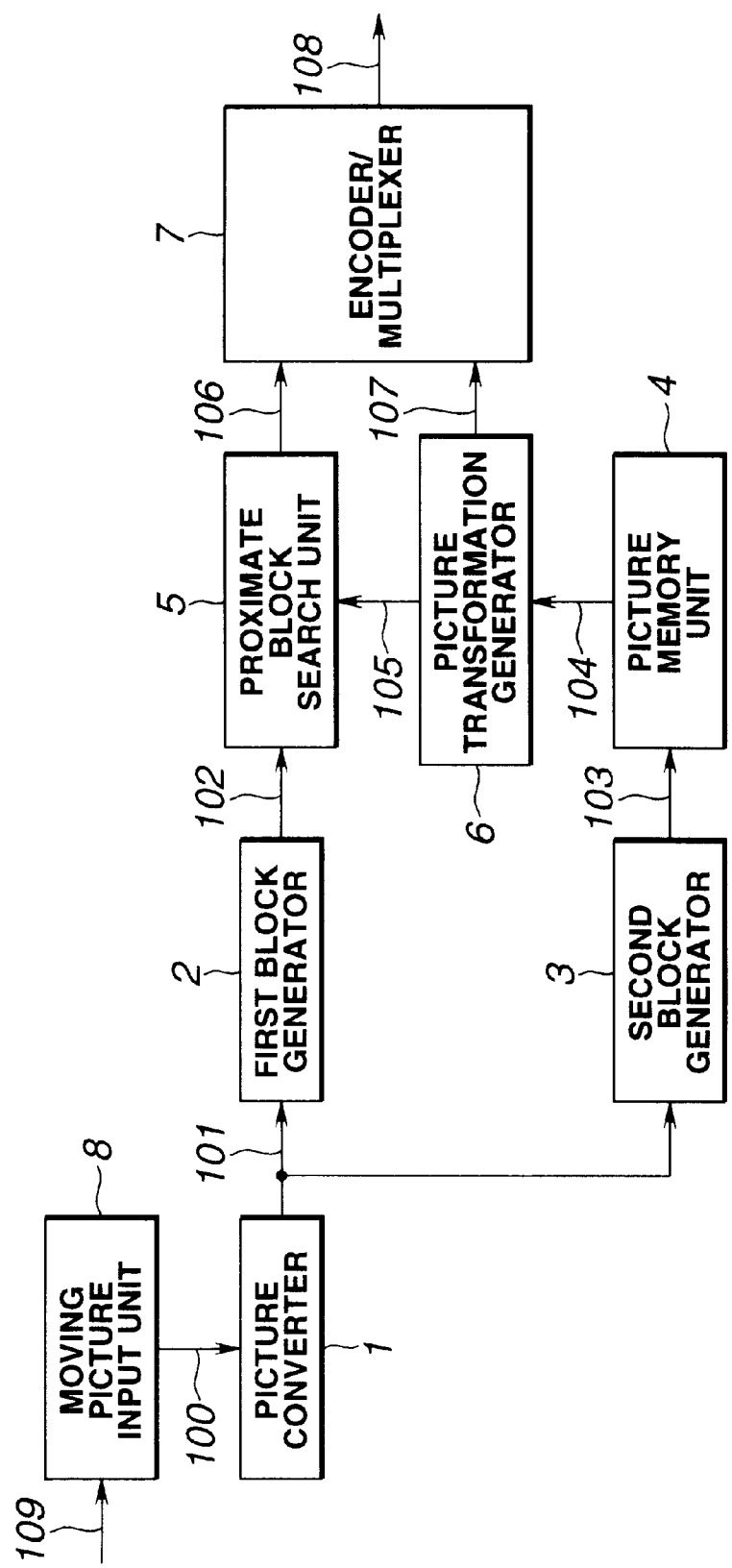
FIG. 9 is a block diagram depicting an encoding device constructed in accordance with an alternative embodiment of the invention.

Referring next to FIG. 9, an encoder constructed in accordance with an alternative embodiment of the invention will now be described. As is shown in FIG. 9, an input picture, which comprises a series of pictures forming a moving picture input 109, is supplied to a moving picture input unit 8. The moving picture input unit resolves each of the moving pictures 109 to an interlaced format, thereby forming a plurality of original pictures 100. Thus, the moving picture input stream is converted from any particular format which is utilized to a standard interlaced picture comprising two fields per frame having interlaced scanning lines. After supplying a plurality of original pictures, the encoding of each individual picture 100 takes place in the manner described above in conjunction with the first embodiment of FIG. 1.

Figure 10:
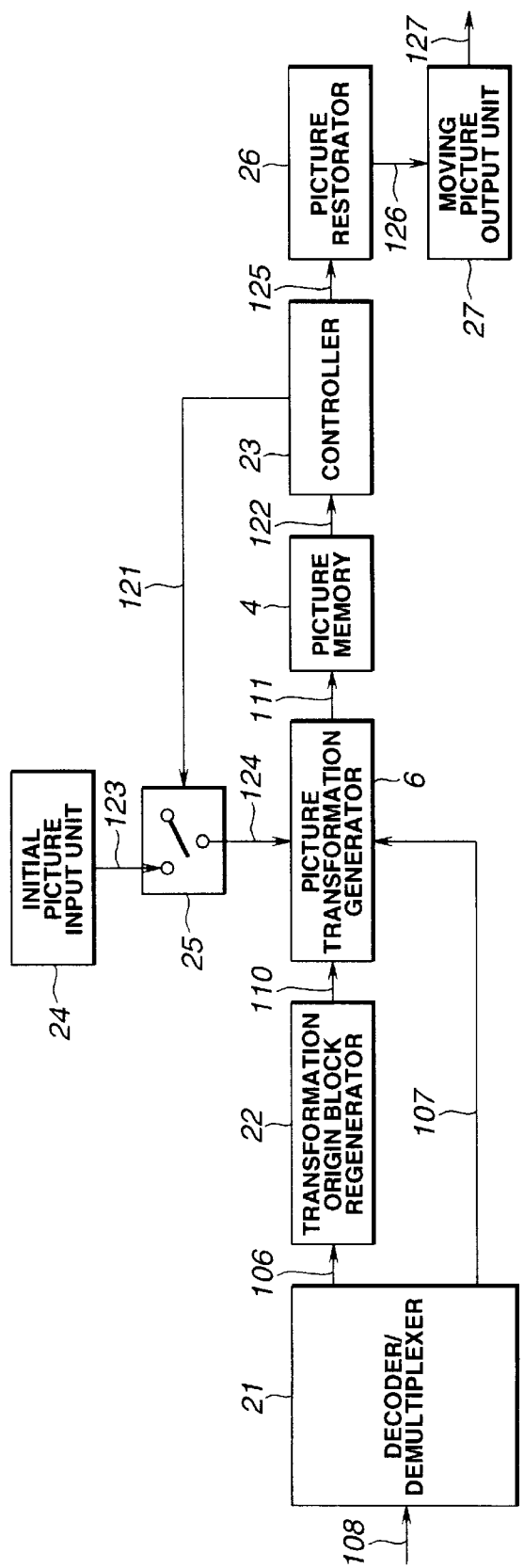
FIG. 10 is a block diagram depicting a decoding device constructed in accordance with an alternative embodiment of the invention.
Figure 11:
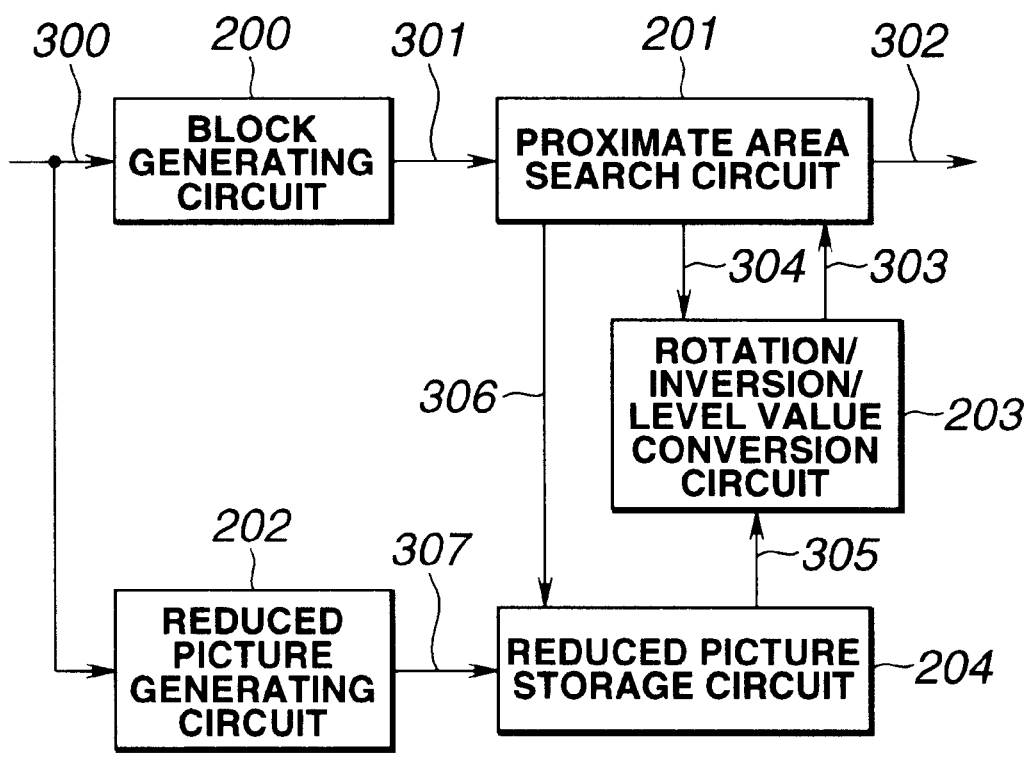
FIG. 11 is a block diagram depicting the structure of a conventional, prior art encoding device.
Figure 12:
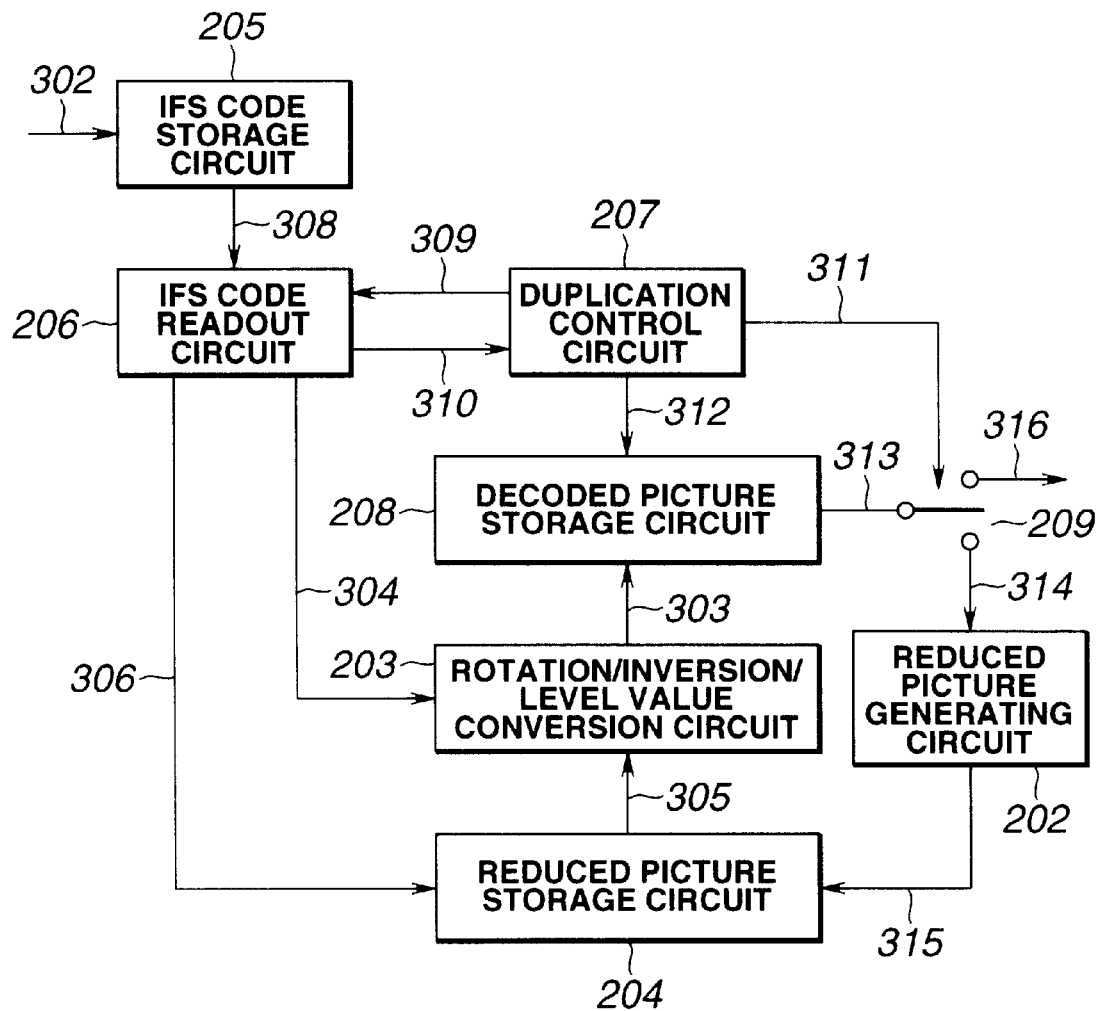
FIG. 12 is a block diagram depicting the structure of a conventional, prior art decoding device.

Additionally, a decoding device constructed in accordance with an alternative embodiment of the invention, and corresponding to the alternative encoding device shown in FIG. 9, will now be explained making reference to FIG. 10. FIG. 10 is similar to FIG. 6, but here, output 126 from picture restorer 26 is coupled to a moving picture output unit 27 where a plurality of decoded interlaced pictures are reconstructed into a moving picture format and are output as moving picture 127. The remainder of the decoding features of the apparatus shown in FIG. 10 operate as explained above with respect to FIG. 6. Thus, in accordance with the encoding and decoding devices constructed in accordance with the alternative embodiment of the invention, a continuous stream of moving pictures can be encoded and properly decoded. Additionally, pictures having various other formats may also be encoded and decoded by appropriate means for converting the picture to an interlaced picture to be supplied to the encoder, and from an interlaced picture which is output from the decoder.

In accordance with the invention, a recording medium contains thereon encoded picture signals generated by the encoding method noted above; and these encoded picture signals are decoded from the recording medium.

While the encoding and decoding apparatus and method according to the invention have been shown with respect to block diagrams, in addition to providing different physical elements for each block, the entire method and apparatus may be implemented on a multipurpose computer being programmed for this use. In this regard, a recording medium, similar to recording medium 400, or other storage device, may contain operating instructions to perform each of the steps set forth in the method noted above for encoding and decoding. It should also be noted that instead of a recording medium 400, a transmission channel connected to a communications network or the like may be provided to receive and transmit data from an encoder, and to decode the encoded data.

The encoding and decoding apparatus and method in accordance with the invention may be employed for encoding and decoding information from a digital video disk, a picture data base, picture compression and expansion units, picture downloading on the Internet, or software modules implementing these systems, by way of example.

According to the encoding device constructed in accordance with the invention, an input picture is rearrayed on a scanning line basis and transformed into two field pictures lined up side by side in a single frame. Afterwards, similar blocks may be retrieved in accordance with an IFS encoding scheme; and these similar blocks can be determined more easily inside each field picture, thereby improving the encoding efficiency. Also, in the encoding device, similar blocks can be searched from both field pictures of a frame to improve the encoding efficiency. Additionally, the encoding technique allows for a moving picture to be re-arrayed on a scanning line basis.

Since a separate affine transformation unit executing a series of transformation processing operations such as rotation, vertical or lateral movement, enlargement or contraction, or change of perspective or orientation may be included within the encoding device, the processing system may be simplified while transformation can be quickly carried out. Since this same affine transformation unit may be included with the decoding device, decoding may be simplified also and therefore, transformation can be carried out promptly.

The decoding device and apparatus can also improve operation by re-arraying a picture on a scanning line basis for both a single picture and moving pictures. Also, by storing on the recording medium the encoding and decoding software, the entire apparatus may be implemented by a suitably programmed multipurpose computer and, therefore, the apparatus and method, in accordance with the invention, can be implemented much more quickly, and at reduced cost.

It will thus be seen that the objects set forth above, among those made apparent from the preceding description, are efficiently obtained and, since certain changes may be made in carrying out the above method and in the constructions set forth without departing from the spirit and scope of the invention, it is intended that all matter contained in the above description and shown in the accompanying drawings interpreted as illustrative and not in a limiting sense.

It is also to be understood that the following claims are intended to cover all the generic and specific features of the invention herein described, and all statements of the scope of the invention which, as a matter of language, might be said to fall therein.

We claim:

1. A method for encoding an interlaced picture having a first field and a second field, comprising the steps of:
    re-arraying said interlaced picture on a scanning line basis;
    splitting the re-arrayed picture into a plurality of first block portions;
    splitting the re-arrayed picture into a plurality of second block portions;
    performing transform processing on each second block portion to generate a plurality of transformed block portions;
    determining a transformed block portion most similar to a preselected first block portion;
    selecting the second block portion corresponding to the determined transformed block portion; and
    outputting as a code block position information indicating a position of the selected second block portion and a transformation parameter representing the transform processing of the selected second block portion.

2. The method according to claim 1, further comprising the steps of:
    resolving each frame of a supplied moving picture sequence into an interlaced picture including a first field and a second field; and
    inputting said interlaced pictures sequentially.

3. The method according to claim 1, wherein said transform processing includes an affine transformation process including at least one of rotation, lateral or vertical movement, contraction or enlargement.

4. The method according to claim 1, wherein said step of re-arraying comprises arranging said first field and said second field in separate areas in one frame.

5. An apparatus for encoding an interlaced picture having a first field and a second field, comprising:
    a converter for re-arraying an interlaced picture on a scanning line basis;
    a first block generator for splitting the re-arrayed picture into a plurality of first block portions;
    a second block generator for splitting the re-arrayed picture into a plurality of second block portions;
    a transform generator for performing transform processing to each second block portion to generate a plurality of transformed block portions;
    a search unit for determining a transformed block portion most similar to a preselected first block portion;
    a selector for selecting the second block portion corresponding to the determined transformed block portion; and
    an output unit for outputting as a code block position information indicating a position of the selected second block portion and a transformation parameter representing the transform processing of the selected second block portion.

6. The apparatus according to claim 5, further comprising:
    a converter for resolving each frame of a supplied moving picture sequence into an interlaced picture including a first field and a second field; and
    an input unit for inputting said interlaced pictures sequentially.

7. The apparatus according to claim 5, wherein said transform generator performs at least an affine transformation process including at least one of rotation, lateral movement, or vertical contraction and enlargement.

8. The apparatus according to claim 5, wherein said converter arranges said first field and said second field in separate areas in one frame.

9. An apparatus for encoding an interlaced picture having a first field and a second field, comprising:
    conversion means for re-arraying an interlaced picture on a scanning line basis;
    first splitting means for splitting the re-arrayed picture into a plurality of first block portions;
    second splitting means for splitting the re-arrayed picture into a plurality of second block portions;
    transform means for performing transform processing to each second block portion to generate a plurality of transformed block portions;

means for determining a transformed block portion most similar to a preselected first block portion;

means for selecting the second block portion corresponding to the determined transformed block portion; and means for outputting as a code block position information indicating a position of the selected second block portion and a transformation parameter representing the transform processing of the selected second block portion.

10. The apparatus according to claim 9, further comprising:

means for resolving each frame of a supplied moving picture sequence into an interlaced picture including a first field and a second field; and means for inputting said interlaced pictures sequentially.

11. The apparatus according to claim 9, wherein said transform means performs at least an affine transformation process including at least one of rotation, lateral movement, or vertical contraction and enlargement.

12. The apparatus according to claim 9, wherein said conversion means arranges said first field and said second field in separate areas in one frame.

13. A method for producing a decoded picture from a code representing blocks of an encoded interlaced picture, comprising the steps of:

receiving said code including block position information indicating a position in a picture of a pre-transformed block and a transformation parameter representing a defined transform processing of said pre-transformed block;

performing transformation processing on a block identified by said block position information, said transformation processing being based on said transformation parameter;

constructing a decoded picture from the transformation processed blocks; and re-arraying the decoded picture on a scanning line basis to construct an output picture.

14. The method according to claim 13, further comprising the steps of:

performing said defined transformation processing recursively; and stopping the recursive transformation processing after it has been performed a predetermined number of times.

15. The method according to claim 14, wherein said block position information selectively indicates a block in an initial picture or a block in a decoded picture constructed from the transformation processed blocks.

16. The method according to claim 15, wherein said block indicated by said block position information is a block in the initial picture when decoding begins and said block is in the decoded picture previously constructed from the transformation processed blocks after decoding has begun.

17. The method according to claim 13, further comprising the step of:

generating a moving picture from constructed output pictures.

18. The method according to claim 13, wherein said transformation processing is an affine transformation including at least one of rotation, lateral or vertical movement, contraction or enlargement.

19. The method according to claim 13, wherein said decoded pictures is rearrayed by re-arraying first and second fields arranged in separate areas in one frame of said decoded picture into an output picture format.

20. An apparatus for producing a decoded picture from a code representing blocks of an encoded interlaced picture, comprising:

an input for receiving said code including block position information indicating a position in a picture of a pre-transformed block and a transformation parameter representing a defined transform processing of said pre-transformed block;

a picture transformation generator for performing transformation processing on a block identified by said block position information, said transformation processing being based on the transformation parameter;

a controller for constructing a decoded picture from the transformation processed blocks; and a restorer for re-arraying the decoded picture on a scanning line basis to construct an output picture.

21. The apparatus according to claim 20, wherein said picture transformation generator performs the defined transformation processing recursively until a predetermined number of transformations has been performed.

22. The apparatus according to claim 21, wherein the block indicated by said block position information is selectively a block in an initial picture or a block in a decoded picture produced by the picture transformation generator.

23. The apparatus according to claim 22, wherein the block indicated by said block position information is in the initial picture when decoding begins and is in the decoded picture previously constructed from the transformation processed blocks.

24. The apparatus according to claim 20, further comprising:

an converter for constructing a moving picture from output pictures.

25. The apparatus according to claim 20, wherein said picture transformation generator performs an affine transformation including at least one of rotation, lateral or vertical movement, contraction and enlargement.

26. The apparatus according to claim 20, wherein said restorer re-arrays first and second fields arranged in separate areas in one frame of said decoded picture into an output picture format.

27. An apparatus for producing a decoded picture from a code representing blocks of an encoded interlaced picture, comprising:

means for receiving said code including block position information indicating a position in a picture of a pre-transformed block and a transformation parameter representing a defined transform processing of said pre-transformed block;

picture transformation means for performing transformation processing on a block identified by said block position information, said transformation processing being based on the transformation parameter;

means for constructing a decoded picture from the transformation processed blocks; and restoration means for re-arraying the decoded picture on a scanning line basis to construct an output picture.

28. The apparatus according to claim 27, wherein said picture transformation means performs the defined transformation processing recursively until a predetermined number of transformations has been performed.

29. The apparatus according to claim 28, wherein the block indicated by said block position information is selectively a block in an initial picture or a block in a decoded picture produced by the picture transformation means.

30. The apparatus according to claim 29, wherein the block indicated by said block position information is in the initial picture when decoding begins and is in the decoded picture previously constructed from the transformation processed blocks.

31. The apparatus according to claim 27, further comprising:
   means for constructing a moving picture from output pictures.

32. The apparatus according to claim 27, wherein said picture transformation means performs an affine transformation including at least one of rotation, lateral or vertical movement, contraction and enlargement.

33. The apparatus according to claim 27, wherein said restoration means re-arrays first and second fields arranged in separate areas in one frame of said decoded picture into an output picture format.

34. A recording medium having recorded thereon a code representing blocks of an encoded interlaced picture, said record medium being prepared by the steps of: re-arraying said interlaced picture on a scanning line basis;
   splitting the re-arrayed picture into a plurality of first block portions;
   splitting the re-arrayed picture into a plurality of second block portions;
   performing defined transform processing on each second block portion to generate a plurality of transformed block portions;
   determining a transformed block portion most similar to a preselected first block portion;
   selecting the second block portion corresponding to the determined transformed block portion;
   outputting as a code block position information indicating a position of the selected second block portion and a transformation parameter representing the transform processing of the selected second block portion; and
   recording said code on the record medium.

35. A record medium decodable by a decoding device, the record medium having a signal recorded thereon as a code representing blocks of an encoded interlaced picture, said record medium being decoded by the steps of:
   receiving said code including block position information indicating a position in a picture of a pre-transformed block and a transformation parameter representing a defined transform processing of said pre-transformed block;
   performing defined transformation processing on a block identified by said block position information, said transformation processing being based on said transformation parameter;
   constructing a decoded picture from the transformation processed blocks; and
   re-arraying the decoded picture on a scanning line basis to construct an output picture.

36. A record medium having recorded thereon an encoding program for encoding an interlaced picture, said encoding program comprising the steps of:
   re-arraying said interlaced picture on a scanning line basis;
   splitting the re-arrayed picture into a plurality of first block portions;
   splitting the re-arrayed picture into a plurality of second block portions;
   performing defined transform processing on each second block portion to generate a plurality of transformed block portions;
   determining a transformed block picture most similar to a preselected first block portion;
   selecting the second block portion corresponding to the determined transformed block portion; and
   outputting as a code block position information indicating a position of the selected second block portion and a transformation parameter representing the transform processing of the selected second block portion.

37. A record medium having recorded thereon a decoding program for producing a decoded picture from an encoded interlaced picture, said decoding program comprising the steps of:
   receiving a code including block position information indicating a position in a picture of a pre-transformed block and a transformation parameter representing a defined transform processing of said pre-transformed block;
   performing defined transformation processing on a block identified by said block position information, said transformation processing being based on the transformation parameter;
   constructing a decoded picture from the transformation processed blocks; and
   re-arraying the decoded picture on a scanning line basis to construct an output picture.

\* \* \* \* \*